(12) United States Patent
Schäuble et al.

(10) Patent No.: US 11,011,823 B2
(45) Date of Patent: May 18, 2021

(54) AUTOMATION FIELD DEVICE

(71) Applicant: Endress+Hauser SE+Co. KG, Maulburg (DE)

(72) Inventors: Harald Schäuble, Lörrach (DE); Max Bauer, Rheinfelden (DE); Marc Schlederer, Maulburg (DE); Armend Zenuni, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 38 days.

(21) Appl. No.: 16/614,610

(22) PCT Filed: Apr. 10, 2018

(86) PCT No.: PCT/EP2018/059110
§ 371 (c)(1),
(2) Date: Nov. 18, 2019

(87) PCT Pub. No.: WO2018/210490
PCT Pub. Date: Nov. 22, 2018

(65) Prior Publication Data
US 2020/0185812 A1    Jun. 11, 2020

(30) Foreign Application Priority Data

May 16, 2017  (DE) .................... 10 2017 110 597.2

(51) Int. Cl.
*H01Q 1/22* (2006.01)
*G01F 23/284* (2006.01)
(Continued)

(52) U.S. Cl.
CPC ......... *H01Q 1/2233* (2013.01); *G01F 23/284* (2013.01); *G05B 19/0423* (2013.01);
(Continued)

(58) Field of Classification Search
CPC .................... H01Q 1/2233; H01Q 9/0471
(Continued)

(56) References Cited

U.S. PATENT DOCUMENTS 9,722,364 B1 *  8/2017  Chueh .................... H02H 9/041
2005/0245291 A1 * 11/2005  Brown ............... G05B 19/4185
455/572
(Continued)

FOREIGN PATENT DOCUMENTS

CN        102066880 A      5/2011
CN        103457023 A     12/2013
(Continued)

*Primary Examiner* — Lam T Mai
(74) *Attorney, Agent, or Firm* — Christopher R. Powers; Endress+Hauser (USA) Holding Inc.

(57) ABSTRACT

A field device of automation technology, including: an at least partially metal housing having at least one housing opening; a field device electronics arranged within the housing; a cable gland, which is located in the housing opening, wherein at least one cable extends through the cable gland into the housing and is connected with the field device electronics such that wired communication can occur via the cable with the field device electronics; and an antenna for transmitting and/or receiving electromagnetic waves having at least one determined wavelength, wherein the antenna is situated in the cable gland such that the antenna at least partially surrounds the cable, and wherein the antenna is connected with the field device electronics via a coaxial cable such that wireless communication can occur via the antenna with the field device electronics.

14 Claims, 1 Drawing Sheet

(51) Int. Cl.
*G05B 19/042* (2006.01)
*H01Q 9/04* (2006.01)

(52) U.S. Cl.
CPC . *H01Q 9/0471* (2013.01); *G05B 2219/15117* (2013.01); *G05B 2219/25428* (2013.01)

(58) Field of Classification Search
USPC ..................................................... 341/700 R
See application file for complete search history.

(56) References Cited

U.S. PATENT DOCUMENTS

| | | |
|---|---|---|
| 2006/0158371 A1 | 7/2006 | Duivenvoorden |
| 2010/0026515 A1 | 2/2010 | Lazar et al. |
| 2012/0126949 A1 | 5/2012 | Downie et al. |
| 2014/0088893 A1* | 3/2014 | McGuire ............... H02J 50/001 702/58 |
| 2015/0278560 A1* | 10/2015 | Blodt ............... G06K 19/07771 340/10.1 |
| 2018/0034129 A1* | 2/2018 | Blodt ..................... H01Q 1/521 |
| 2020/0166411 A1* | 5/2020 | M rtensson .......... H05K 5/0247 |
| 2020/0185811 A1* | 6/2020 | Willemsen ............... H05K 5/03 |

FOREIGN PATENT DOCUMENTS

| | | |
|---|---|---|
| CN | 104365113 A | 2/2015 |
| DE | 69906958 T2 | 12/2003 |
| DE | 102006030965 A1 | 1/2008 |
| DE | 102010040865 A1 | 3/2012 |
| DE | 102011081517 A1 | 2/2013 |
| DE | 102014118391 A1 | 6/2016 |
| EP | 0449088 A1 | 10/1991 |
| WO | 2016060898 A1 | 4/2016 |

\* cited by examiner

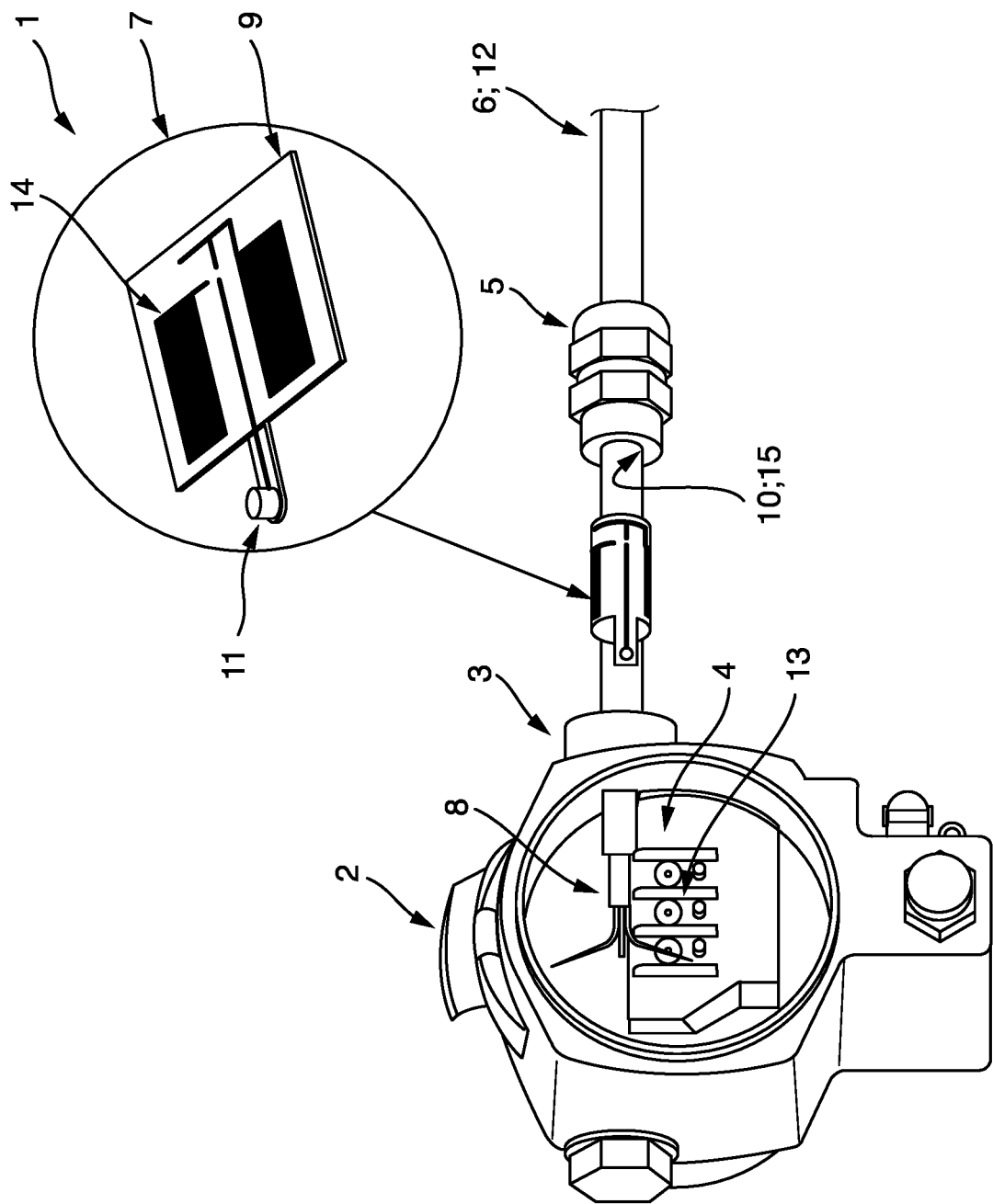

AUTOMATION FIELD DEVICE

CROSS-REFERENCE TO RELATED APPLICATIONS

The present application is related to and claims the priority benefit of German Patent Application No. 10 2017 110 597.2, filed on May 16, 2017 and International Patent Application No. PCT/EP2018/059110, filed on Apr. 10, 2018, the entire contents of which are incorporated herein by reference.

TECHNICAL FIELD

The invention relates to a field device of automation technology as well as to a cable gland for a field device.

BACKGROUND

In automation technology, especially in process automation technology, field devices are often installed, which serve for determining, optimizing and/or influencing process variables. Serving for registering process variables are sensors, such as, for example, fill level measuring devices, flow measuring devices, pressure- and temperature measuring devices, conductivity measuring devices, etc., which register the corresponding process variables, fill level, flow, pressure, temperature, and conductivity. Serving for influencing process variables are actuators, such as, for example, valves or pumps, via which the flow of a liquid in a pipe, tube or pipeline section, or the fill level in a container, can be changed. Referred to as field devices are, in principle, all devices, which are applied near to the process and which deliver, or process, process relevant information. In connection with the invention, the terminology, field devices, thus, refers also to remote I/Os (e.g., electrical interfaces), radio adapters, and, in general, devices, which are arranged at the field level. A large number of such field devices are manufactured and sold by the firm, Endress+Hauser.

In modern industrial facilities, field devices are generally connected via fieldbuses with superordinated units. Normally, the superordinated units are control systems, or control units, such as, for example, a PLC (programmable logic controller). The superordinated units serve, among other things, for process control, process visualizing, process monitoring as well as for start-up of the field devices. The process variables or data registered by the field devices, especially by their sensors, are transmitted via the connected fieldbus to one or, in given cases, even a number of superordinated units. In addition, also a data transmission from the superordinated unit via the bus system to the field devices is required; this can serve, for example, for diagnostic purposes. In general, the field device is serviced via the fieldbus from the superordinated unit.

Besides a wired data transmission, in the case of such field devices, also increasingly the opportunity must be provided that data can be transmitted wirelessly. For instance, process data, e.g., essentially measured values, could be transmitted to the superordinated unit or even a parametering of the field device by a mobile unit, for example, a tablet, smart phone, etc. could be enabled. In order that a wireless data transmission can be implemented, the field devices must be equipped with a corresponding radio antenna, which is adapted for transmitting and for receiving electromagnetic waves.

The equipping of field devices with radio antennas has, however, the problem that field device housings are most often made of a conductive material, especially metal, which means that electromagnetic waves are either greatly attenuated or possibly cannot pass through the housing at all. This constraint leads, in turn, to the fact that the range of the radio signal for wireless data transmission with the field device is very small.

In order to achieve a greater range of the radio signal, for example, in DE 10 2014 118 391 A1, a field device is provided, in the case of which electromagnetic waves emitted from a primary antenna arranged within the field device are coupled to a first secondary antenna within the housing and then transmitted from the first secondary antenna to a second secondary antenna away from the housing, in order then to be out-coupled from the second secondary antenna. The transmission from the housing interior to the housing exterior occurs, in such case, by means of guided waves, whose losses are lower than free waves. The secondary antennas are, in such case, placed in a cable gland. Disadvantageous in the solution described in DE 10 2014 118 391 A1 is the complex construction composed of a number of individual antennas, which must be adapted to one another, and that the cable gland, in which the secondary antenna is integrated, serves only as a blind plug and no longer can be used for the actually intended use, that of guiding a cable.

Accordingly, an object of the invention is to remedy this situation.

SUMMARY

The object of the invention is achieved by a field device of automation technology, comprising:
  an at least partially metal housing having at least one housing opening;
  a field device electronics arranged within the housing;
  a cable gland, which is located in the housing opening, wherein at least one cable extends through the cable gland into the housing and is connected with the field device electronics, so that communication can occur wired via the cable with the field device electronics;
  an antenna for transmitting and/or receiving electromagnetic waves having at least one determined wavelength, wherein the antenna is situated in the cable gland in such a manner that the antenna at least partially surrounds the cable and the antenna is connected with the field device electronics via a coaxial cable, so that communication can occur wirelessly via the antenna with the field device electronics.

According to the invention, it is, thus, provided to embody the antenna and to introduce it into the cable gland in such a manner that such at least partially surrounds the cable. The antenna is, in such case, embodied in such a manner that it is adapted for a predetermined frequency, or wavelength. Usual frequencies, for example, for a near field communication lie, in general, at 2.4 GHz (e.g., WLAN, Bluetooth, ANT). Thus, the antenna can, for example, as a result of corresponding antenna structures, be embodied in such a manner that such serves for transmitting data according to the Bluetooth standard IEEE 802.15 or a modified variant thereof, for example, Bluetooth LE (Low Energy).

An advantageous, further development of the invention provides that the antenna is embodied based on a flexible substrate, especially a flexible printed circuit board, and introduced into the cable gland in such a manner that the flexible substrate rests against an inner wall of the cable gland or is incorporated in the inner wall. Especially, the further development can provide that the flexible substrate comprises polyimide.

An alternative further development of the invention provides that the antenna is embodied based on a metal, especially flexible wire and is situated in the cable gland in such a manner that the metal wire rests against an inner wall of the cable gland or is incorporated in the inner wall.

Another advantageous, further development of the invention provides that the inner wall of the cable gland has a cavity, which is embodied in such a manner that the antenna is at least partially accommodated and secured by the cavity, when the antenna rests against the inner wall.

In turn, another advantageous, further development provides that the cable gland comprises a PG (Panzergewinde) cable gland, especially an M20 PG cable gland.

BRIEF DESCRIPTION OF THE DRAWING

The invention will now be explained in greater detail based on the appended drawing, the sole FIGURE of which show as follows:

FIG. 1 shows an embodiment of the field device of the present disclosure.

DETAILED DESCRIPTION

FIG. 1 shows an embodiment of the field device 1 of the invention, which includes a metal housing 2, in which a field device electronics 4 is arranged. The field device electronics 4 is embodied in such a manner that such has connection terminals, via which a cable 6, for example, a two-wire cable 12 or a four-wire cable 12 can be connected. Via the cable 6, the field device electronics 4 and, thus, the field device 1 is connected to a superordinated unit (not shown), in order to communicate data, especially data with reference to measured values, to the superordinated unit by wire. Depending on a specific embodiment of the field device 1, the cable 6 can be embodied either as a two-wire line 12, so that both data as well as also energy for energy supply are fed to the field device electronics 4 via a total of two wires, or as a four-wire line 12, so that the data and energy are fed to the field device electronics 4 via a total of four wires.

In order to be able to lead the cable 6 coming from outside of the housing 2 to the connection terminals 13 arranged in the housing 2, the metal housing 2 has a housing opening 3. Mounted in the housing opening 3 is a cable gland 5, so that the cable 6 may be introduced into the housing 2 through the cable gland 5. As already indicated, the cable gland 5 can, in such case, be embodied in such a manner that a cable 6 in the form of a two-wire line 12 or a four-wire line 12 extends into the housing 2. The cable gland 5 is preferably made of a plastic material. The cable gland 5 can be embodied, for example, as an M20 PG cable gland, i.e., having an outer diameter of 20 mm.

Situated in the cable gland 5 is an antenna 7 for receiving and transmitting electromagnetic waves having a predetermined wavelength or frequency. Antenna 7 is situated according to the invention in such a manner that it at least partially surrounds the cable 6 in the region of the cable gland 5.

Antenna 7 can, for example, be embodied based on a flexible support material (or substrate) 9 with antenna structures 14, so that such can be wound around the cable 6, and the cable 6 with the antenna 7 wound around it extends in and through the cable gland 5. In order that the antenna 7 has the required elasticity, the thickness of the support material 9 where the antenna structures 14 are embodied is selected such that the support material 9 of the antenna 7 can be wound around the cable 6 for the introduction into the cable gland 5. Antenna 7 can, for example, be embodied in the form of a flexible printed circuit board, in the case of which the antenna 7, or the antenna structures 14, are placed on the flexible substrate. The flexible substrate, which forms the base for the antenna 7, preferably comprises polyimide.

The antenna 7 embodied based on a flexible substrate can surround the cable 6 and either rest against an inner wall 10 of the cable gland 5 or be incorporated or integrated into the inner wall 10 of the cable gland 5. The latter can be implemented, for example, by incorporating the antenna 7 in the cable gland 5 during manufacture, for example, using injection molding.

In an embodiment in which the antenna 7 surrounds the cable 6 and rests against the inner wall 10, it can be of advantage when the inner wall 10 has a cavity 15 (e.g., a recess) to accommodate the antenna 7. Because of the cavity 15, the antenna 7 can be secured in the cable gland 5 and so prevent that the antenna 7, for example, slips out of place during the introduction, or feeding, of the cable 6 through the cable gland 5.

Alternatively, the antenna 7 can be embodied, instead of based on a flexible support material 9, to be based on a metal wire, which is windable around the cable 6 and then introducible together with the cable into the cable gland 5. Likewise, the metal wire can also be incorporated into the inner wall 10 of the cable gland 5, for example, during manufacture of the cable gland 5.

Antenna 7 includes, furthermore, at least one connection region in the form of a coaxial cable connection 11. Via the connection region, the antenna 7 in the cable gland 5 is connected to the field device electronics 4 via a coaxial cable 8. The connecting of the coaxial cable 8 to the coaxial cable connection 11 can, in such case, be either permanent or releasable. In the case of a permanent connection between coaxial cable 8 and coaxial cable connector 11, these are preferably soldered or adhered. In the case of the releasable connecting, the coaxial cable 8 and the coaxial cable connector 11 can, for example, be implemented in the form of a plug socket connection.

In order to perform a parametering of the field device 1, especially parameter values can be communicated via the antenna 7 between the field device electronics 4 and a mobile service unit (not shown) provided with an antenna corresponding to the antenna 7. In contrast, the field device electronics 4 communicates especially measured values with the superordinated unit via the cable 6, which extends through the cable gland 5. The mobile service unit can, in principle, be any device that has a radio antenna corresponding to the antenna 7 integrated in the cable gland 5, for example, a device in the form of a smartphone, tablet or the like.

The invention claimed is:

1. A field device for process automation technology, comprising:
   an at least partially metal housing including at least one housing opening;
   a field device electronics disposed within the housing;
   a cable gland at least partially disposed in the housing opening, wherein at least one cable extends from outside the housing, through the cable gland and into the housing, the at least one cable connected with the field device electronics as to enable wired communication via the at least one cable with the field device electronics; and
   an antenna structured for transmitting and/or receiving electromagnetic waves having at least one selected wavelength, wherein the antenna at least partially surrounds a portion of the at least one cable and is disposed in the cable gland, and wherein the antenna is connected with the field device electronics via a coaxial cable attached to the field device electronics as to enable wirelessly communication with the field device electronics from outside the housing via the antenna.

2. The field device of claim 1, wherein the antenna is based on a flexible substrate and is disposed in the cable gland such that the flexible substrate rests against an inner wall of the cable gland or is incorporated in the inner wall of the cable gland.

3. The field device of claim 2, wherein the flexible substrate of the antenna is a flexible printed circuit board.

4. The field device of claim 2, wherein the flexible substrate comprises polyimide.

5. The field device of claim 1, wherein the antenna is configured based on a metal wire and introduced into the cable gland such that the metal wire rests against an inner wall of the cable gland or is incorporated in the inner wall.

6. The field device of claim 1, wherein the cable gland includes an inner wall that includes a cavity that is configured to at least partially accommodated and secure the antenna as the antenna rests against the inner wall as disposed in the cable gland.

7. The field device of claim 1, wherein the cable gland comprises a PG cable gland.

8. The field device of claim 7, wherein the PG cable gland is an M20 PG cable gland.

9. The field device of claim 1, wherein the cable gland is configured to enable a two-conductor or four-conductor cable to extend through the cable gland and into the housing, and wherein the field device electronics is connected with the two-conductor cable or the four-conductor cable such that the field device electronics receives wired communicates via the two-conductor or four-conductor cable.

10. The field device of claim 1, wherein the field device electronics is further configured to enable parameter values, which serve to set a parameter of the field device, to be wirelessly communicated to the field device electronics via the antenna.

11. A cable gland for a field device of automation technology, comprising:
an antenna for transmitting and/or receiving electromagnetic waves having at least one selected wavelength, the antenna disposed in the cable gland such that the antenna at least partially surrounds a cable that extends into and through the cable gland, wherein the antenna includes a coaxial cable connector to enable an electrical connection to the antenna.

12. The cable gland of claim 11, wherein the coaxial cable connector includes a solder area configured to enable soldering of the coaxial cable connection of the antenna as to enable electrical contact between the antenna and field device electronics within the housing to be made after the cable gland has been inserted into a housing of a field device.

13. The cable gland of claim 11, wherein the coaxial cable connector includes a plug connector configured to enable electrical contact between the antenna and field device electronics within the housing via a corresponding complementary socket of the field device electronics, thereby enabling the electrical contact to be made after the cable gland has been introduced into a housing of a field device.

14. The cable gland of claim 11, wherein the cable gland is a PG cable gland.

* * * * *